United States Patent
Tan et al.

(10) Patent No.: US 9,683,393 B2
(45) Date of Patent: Jun. 20, 2017

(54) SYSTEM FOR PHYSICALLY SECURING AN ELECTRONIC DEVICE

(71) Applicant: ACCO Brands Corporation, Lake Zurich, IL (US)

(72) Inventors: John Tan, Richmond (CA); Wei Chen, Coquitlam (CA)

(73) Assignee: ACCO Brands Corporation, Lake Zurich, IL (US)

( * ) Notice: Subject to any disclaimer, the term of this patent is extended or adjusted under 35 U.S.C. 154(b) by 0 days.

(21) Appl. No.: 14/923,823

(22) Filed: Oct. 27, 2015

(65) Prior Publication Data

US 2016/0123043 A1    May 5, 2016

Related U.S. Application Data

(60) Provisional application No. 62/073,357, filed on Oct. 31, 2014.

(51) Int. Cl.
*G06F 1/16* (2006.01)
*H05K 7/00* (2006.01)
(Continued)

(52) U.S. Cl.
CPC ...... *E05B 73/0082* (2013.01); *E05B 47/0012* (2013.01); *E05B 73/0005* (2013.01);
(Continued)

(58) Field of Classification Search
CPC ...... G06F 1/1669; G06F 1/1683; G06F 1/182; G06F 1/1679; E05B 67/006; E05B 73/0082
(Continued)

(56) References Cited

U.S. PATENT DOCUMENTS

| | | | |
|---|---|---|---|
| 5,361,610 A | * | 11/1994 | Sanders ............... G11B 33/005 248/552 |
| 5,479,799 A | | 1/1996 | Kilman et al. |

(Continued)

FOREIGN PATENT DOCUMENTS

| | | |
|---|---|---|
| CN | 103792992 A | 5/2014 |
| WO | 2010147584 A1 | 12/2010 |

OTHER PUBLICATIONS

Combined Search and Examination Report from the United Kingdom Intellectual Property Office for Application No. GB1519065.5 dated Apr. 29, 2016 (8 pages).

*Primary Examiner* — Anthony Haughton
(74) *Attorney, Agent, or Firm* — Michael Best & Friedrich LLP

(57) ABSTRACT

A system includes an electronic device having a housing with an opening formed therein, a processor positioned within the housing, a motor positioned within the housing and coupled to the processor, and a latch positioned within the housing adjacent the opening. The latch is driven by the motor to move relative to the housing. The system also includes a security member securable to an immovable object. The security member includes a lock head that is insertable into the opening in the housing. The lock head has a recess into which the latch extends to secure the security member to the electronic device. The motor is operable to move the latch out of the recess in the lock head to release the security member from the electronic device.

16 Claims, 6 Drawing Sheets

(51) Int. Cl.
  *H05K 5/00* (2006.01)
  *E05B 73/00* (2006.01)
  *E05B 47/00* (2006.01)
  *G06F 1/18* (2006.01)

(52) U.S. Cl.
  CPC .............. *G06F 1/16* (2013.01); *G06F 1/182* (2013.01); *E05B 2047/0021* (2013.01); *E05B 2047/0095* (2013.01)

(58) Field of Classification Search
  USPC ......... 70/18.58; 361/679.57, 679.09, 679.27,
    361/679.01, 679.43, 679.55, 679.38,
    361/679.06, 679.02, 679.58, 679.23,
    361/679.54, 679.52, 679.4, 679.46,
    361/679.41, 679.32, 679.26; 312/209,
    312/215, 326, 201, 333, 217, 325, 265.2,
    312/235.2, 223.2, 223.6; 429/100, 101;
    16/400, 412, 904, 366, 368, 250, 246,
    16/239, 301, 361, 236, 354, 223;
    345/366, 368, 250, 246, 239, 301, 361,
    345/236, 354, 223
  See application file for complete search history.

(56) References Cited

U.S. PATENT DOCUMENTS

| | | | |
|---|---|---|---|
| 5,608,605 A * | 3/1997 | Siow | E05B 73/0005 361/679.43 |
| 5,634,809 A | 6/1997 | Hirai | |
| 5,675,998 A * | 10/1997 | Monteiro | E05B 73/0005 70/164 |
| 5,709,110 A * | 1/1998 | Greenfield | E05B 73/0005 248/553 |
| 5,757,616 A | 5/1998 | May et al. | |
| 5,787,738 A * | 8/1998 | Brandt | E05B 73/0005 70/14 |
| 6,006,557 A | 12/1999 | Carl et al. | |
| 6,122,163 A | 9/2000 | Stone et al. | |
| 6,182,481 B1 * | 2/2001 | Nagy | E05B 73/0005 248/551 |
| 6,199,413 B1 | 3/2001 | McDaid et al. | |
| 6,212,918 B1 | 4/2001 | Kravtin | |
| 6,227,017 B1 | 5/2001 | Igelmund | |
| 6,463,770 B1 | 10/2002 | Lee | |
| 6,523,373 B1 | 2/2003 | Su | |
| 6,553,794 B1 | 4/2003 | Murray, Jr. et al. | |
| 6,578,394 B2 * | 6/2003 | Yin | E05B 73/0005 248/551 |
| 6,591,642 B1 | 7/2003 | Kuo | |
| 6,729,897 B2 | 5/2004 | Lai | |
| 6,731,212 B2 | 5/2004 | Hirose et al. | |
| 6,745,330 B1 | 6/2004 | Maillot | |
| 6,788,216 B2 * | 9/2004 | Chen | G08B 13/1436 340/566 |
| 6,799,981 B1 | 10/2004 | Yu | |
| 6,991,479 B2 | 1/2006 | Miao | |
| 7,100,403 B2 | 9/2006 | Murray, Jr. et al. | |
| 7,128,595 B2 | 10/2006 | Boutros | |
| 7,160,137 B1 | 1/2007 | Yeh | |
| 7,191,623 B2 * | 3/2007 | Francke | E05B 67/006 70/18 |
| 7,217,146 B2 | 5/2007 | Meister et al. | |
| 7,227,747 B2 | 6/2007 | Walker et al. | |
| 7,249,474 B2 | 7/2007 | Avganim | |
| 7,360,379 B1 | 4/2008 | Lopez | |
| 7,390,201 B1 | 6/2008 | Quinby et al. | |
| 7,428,834 B1 | 9/2008 | Lee | |
| 7,441,426 B2 | 10/2008 | Avganim | |
| 7,462,045 B1 | 12/2008 | Lee | |
| 7,578,691 B2 | 8/2009 | Weksler et al. | |
| 7,635,272 B2 | 12/2009 | Poppe | |
| 7,677,065 B1 | 3/2010 | Miao | |
| 7,722,369 B2 | 5/2010 | Bushby | |
| 7,878,865 B2 | 2/2011 | Desrosiers et al. | |
| 7,913,527 B2 | 3/2011 | Chen | |
| 7,938,863 B2 | 5/2011 | Skinner et al. | |
| 8,001,812 B2 | 8/2011 | Mahaffey et al. | |
| 8,016,609 B1 | 9/2011 | Lin | |
| 8,023,252 B2 | 9/2011 | Dehaan et al. | |
| 8,038,463 B2 | 10/2011 | Ferderer | |
| 8,079,237 B2 | 12/2011 | Yang et al. | |
| 8,107,236 B2 * | 1/2012 | Lin | E05B 73/0082 248/551 |
| 8,111,511 B2 * | 2/2012 | Ruch | E05B 73/0082 248/166 |
| 8,142,212 B2 | 3/2012 | McSweeney et al. | |
| 8,230,707 B2 | 7/2012 | Hung et al. | |
| 8,414,314 B1 | 4/2013 | Mosholder | |
| 8,505,344 B2 | 8/2013 | Su | |
| 2003/0228777 A1 | 12/2003 | Lai | |
| 2005/0097930 A1 | 5/2005 | Moore et al. | |
| 2005/0250369 A1 | 11/2005 | Ferderer | |
| 2006/0107073 A1 | 5/2006 | Lane et al. | |
| 2006/0117814 A1 * | 6/2006 | Francke | E05B 67/006 70/18 |
| 2006/0134952 A1 | 6/2006 | Meister et al. | |
| 2006/0134962 A1 | 6/2006 | Yeh | |
| 2006/0294586 A1 | 12/2006 | Upton | |
| 2008/0110217 A1 * | 5/2008 | Andrews | E05B 73/0082 70/58 |
| 2009/0145184 A1 | 6/2009 | Cheaz | |
| 2009/0184822 A1 | 7/2009 | Mahaffey et al. | |
| 2010/0068932 A1 | 3/2010 | Tsai | |
| 2010/0071423 A1 | 3/2010 | Dehaan et al. | |
| 2010/0192642 A1 * | 8/2010 | Hung | E05B 73/0082 70/58 |
| 2010/0294008 A1 | 11/2010 | Bogdanov et al. | |
| 2010/0320884 A1 * | 12/2010 | Shiroishi | G06F 21/88 312/223.1 |
| 2011/0122551 A1 | 5/2011 | Hung et al. | |
| 2013/0102167 A1 | 4/2013 | Litowitz et al. | |
| 2013/0196527 A1 | 8/2013 | Joe et al. | |
| 2014/0326027 A1 | 11/2014 | Avganim | |

* cited by examiner

SYSTEM FOR PHYSICALLY SECURING AN ELECTRONIC DEVICE

CROSS-REFERENCE TO RELATED APPLICATIONS

This application claims priority to U.S. Provisional Patent Application No. 62/073,357, filed Oct. 31, 2014, the entire contents of which are incorporated by reference herein.

FIELD OF THE INVENTION

The present invention relates to systems for physically securing electronic devices.

SUMMARY

In one embodiment, the invention provides a system including an electronic device having a housing with an opening formed therein, a processor positioned within the housing, a motor positioned within the housing and coupled to the processor, and a latch positioned within the housing adjacent the opening. The latch is driven by the motor to move relative to the housing. The system also includes a security member securable to an immovable object. The security member includes a lock head that is insertable into the opening in the housing. The lock head has a recess into which the latch extends to secure the security member to the electronic device. The motor is operable to move the latch out of the recess in the lock head to release the security member from the electronic device.

In another embodiment, the invention provides a system including an electronic device having a housing with an opening formed therein, a processor positioned within the housing, and a latch mechanism positioned within the housing and coupled to the processor. The system also includes a security member securable to an immovable object. The security member includes a lock head that is insertable into the opening in the housing and engageable by the latch mechanism. The system further includes a portable apparatus operable to send a wireless signal to the processor of the electronic device. The processor is operable to selectively move the latch mechanism out of engagement with the lock head of the security member in response to the wireless signal.

In yet another embodiment, the invention provides a method of securing an electronic device to an immovable object. The electronic device includes a housing having an opening formed therein, a processor positioned within the housing, and a latch mechanism positioned within the housing and coupled to the processor. The method includes securing a security member to the immovable object. The security member includes a lock head. The method also includes inserting the lock head of the security member into the opening of the housing, engaging the lock head of the security member with the latch mechanism to secure the electronic device to the immovable object, sending a wireless signal, by a portable apparatus, to the processor of the electronic device, and moving the latch mechanism out of engagement with the lock head of the security member in response to the wireless signal.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
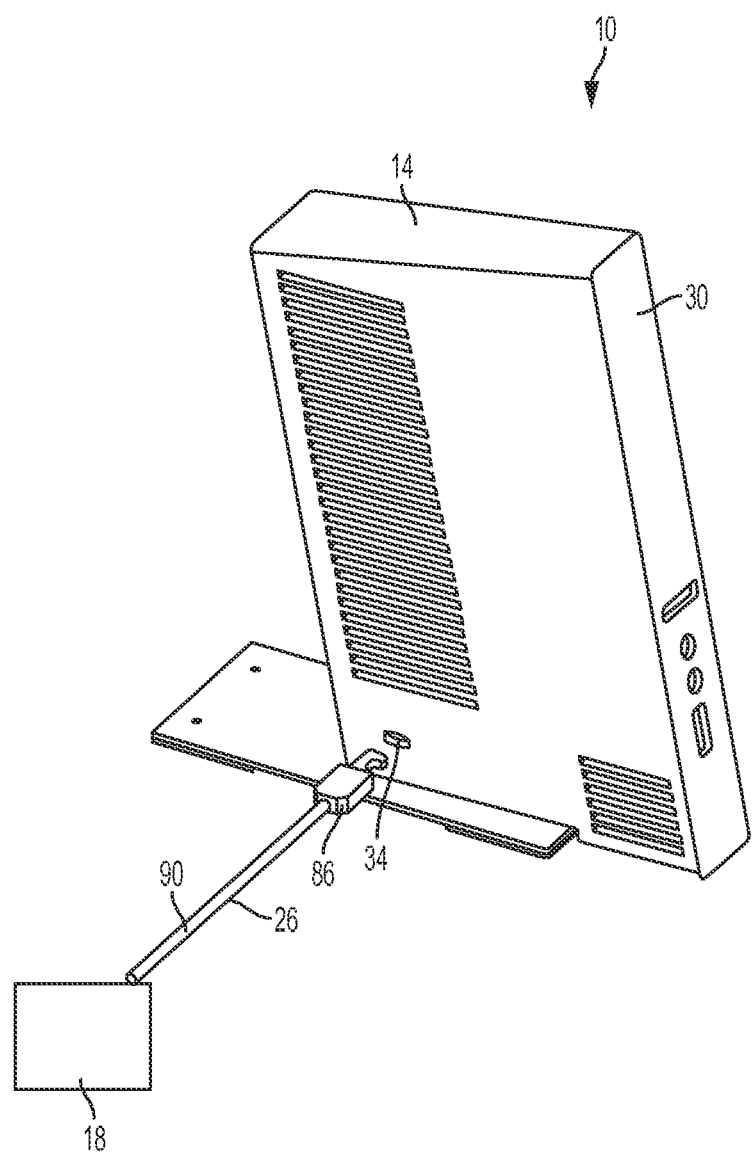
FIG. 1 is a perspective view of a system including an electronic device and a security member secured to an immovable object.

FIG. 1 illustrates a system 10 for securing an electronic device 14 to an immovable object 18. The system 10 includes a latch mechanism 22 (FIG. 2) positioned inside the electronic device 14 and a security member 26 that is selectively engaged by the latch mechanism 22. In the illustrated embodiment, the electronic device 14 is a USB dock. In other embodiments, the electronic device 14 may be a laptop computer, a tablet computer, an eReader, an mp3 player, a monitor, a docking station, a cabinet for charging and/or syncing tablet computers, a credit card reader (e.g., a chip-and-pin machine), or any other computer-type electronic device. The electronic device 14 can be secured to any generally stationary object in a work, home, or retail setting, such as a desk, table, cabinet, wall, or other immovable object.

Figure 2:
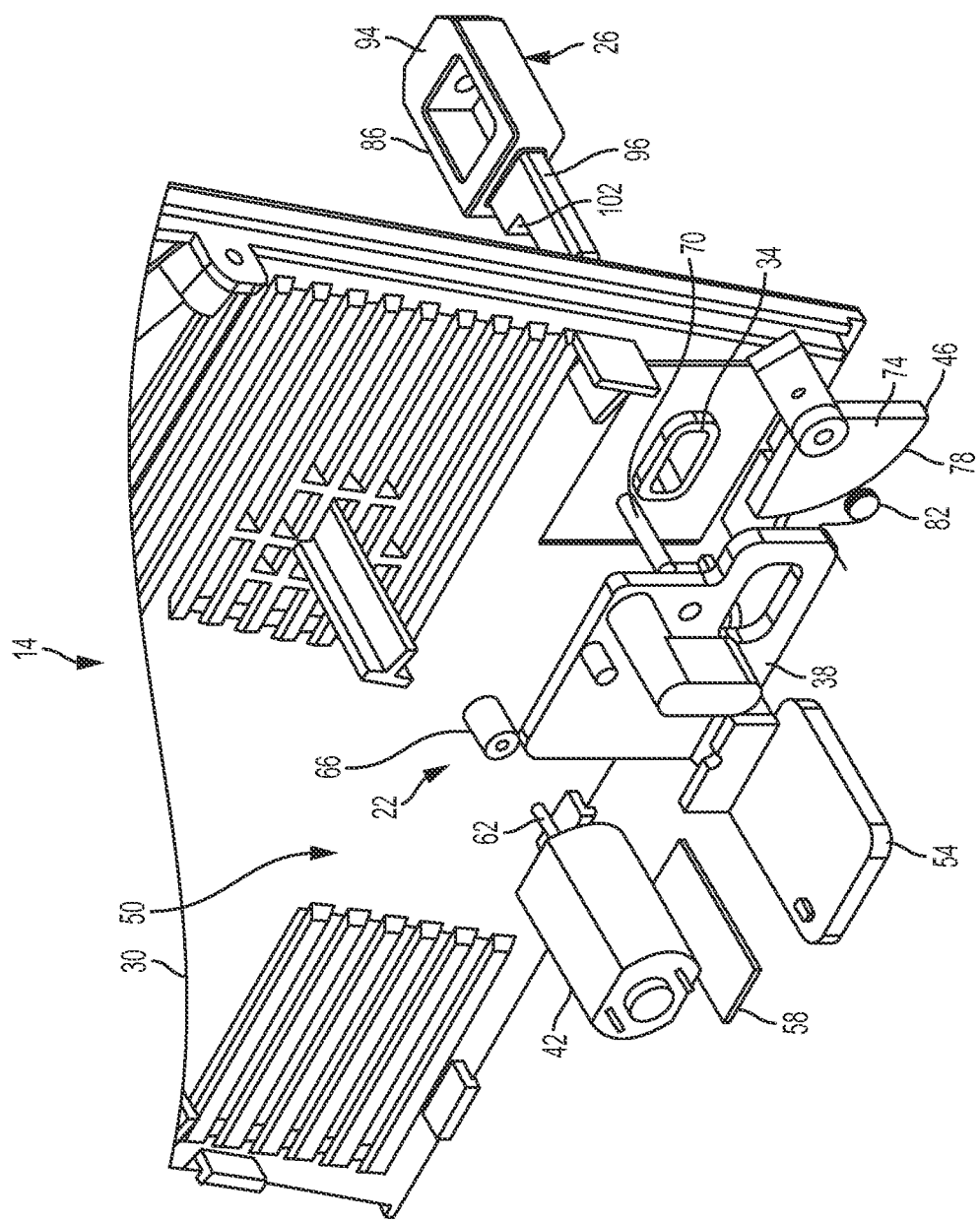
FIG. 2 is an exploded perspective view of an internal portion of the electronic device, including a latch mechanism that selectively engages the security member.

As shown in FIG. 2, the electronic device 14 includes a housing 30 and the latch mechanism 22 positioned within the housing 30. The housing 30 supports various ports and buttons associated with conventional operation of the electronic device 14. The housing 30 also has an opening 34 formed therein. The opening 34, or slot, is configured (e.g., shaped and sized) to receive a portion of the security member 26 (FIG. 1).

The illustrated latch mechanism 22 includes a base 38, a motor 42, and a latch 46. The base 38 is coupled to an inner surface 50 of the housing 30 adjacent the opening 34. In some embodiments, the base 38 is glued to the inner surface 50 or is secured to the inner surface 50 by fasteners (e.g., screws, rivets, etc.). The base 38 supports the other components of the latch mechanism 22. In the illustrated embodiment, the base 38 includes a platform 54 extending generally perpendicularly (e.g., horizontally) from the inner surface 50 of the housing 30.

The motor 42 is positioned on and secured to the platform 54 of the base 38. In the illustrated embodiment, the motor 42 is secured to the platform 54 by an adhesive strip 58. In other embodiments, the motor 42 may be secured to the platform 54 using other suitable coupling means. The illustrated motor 42 includes an output shaft 62 and an output pinion 66 coupled to the output shaft 62. The output shaft 62 and the pinion 66 are rotated when the motor 42 is energized. The motor 42 may be electrically coupled to and energized by the same power source as the other components of the electronic device 14, such as a battery or external power source.

The latch 46, or blocker, is movably coupled to the base 38 adjacent the opening 34. In the illustrated embodiment, the latch 46 is pivotally coupled to the base 38 by a pin 70. The illustrated latch 46 includes a main body 74 that is formed as a gear segment. A series of gear teeth (not illustrated in detail) are formed along an edge 78 of the main body 74. The gear teeth of the latch 46 engage corresponding gear teeth (also not illustrated in detail) on the output pinion 66 of the motor 42 such that the latch 46 is driven by the motor 42 to move the latch 46 relative to the housing 30.

Figure 3:
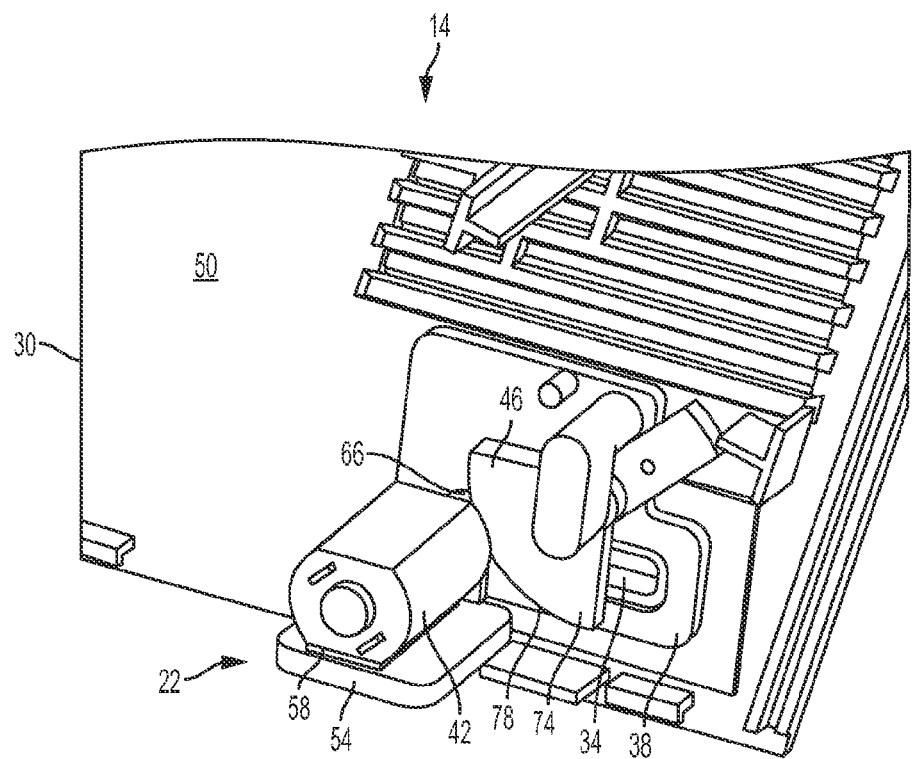
FIG. 3 is a perspective, internal view of the electronic device including the latch mechanism in a first, engaged position.
Figure 4:
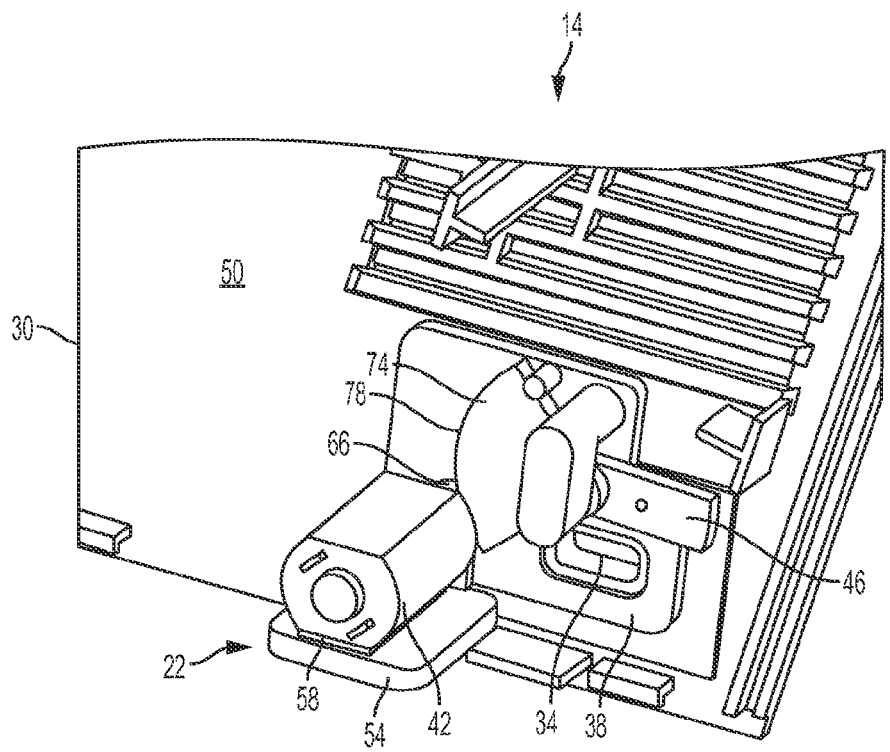
FIG. 4 is a perspective, internal view of the electronic device including the latch mechanism in a second, disengaged position.

As shown in FIGS. 3 and 4, the latch 46 is movable relative to the housing 30 between a first position and a second position. When in the first or engaged position (FIG. 3), the latch 46 extends over a portion of the opening 34 in the housing 30, thereby blocking the portion of the opening 34. When in the second or disengaged position (FIG. 4), the latch 46 is moved away from the opening 34 in the housing 30 so that the opening 34 is substantially unblocked. In the illustrated embodiment, the latch 46 is biased to the first position by a torsion spring 82 (FIG. 2). In such embodiments, the latch 46 is moved to the second position when driven by the motor 42, and automatically returns to the first position when the motor 42 stops driving or holding the latch 46. In other embodiments, the torsion spring 82 may be omitted, and the latch 46 may be drivingly moved between both the first and second positions by the motor 42.

Figure 5:
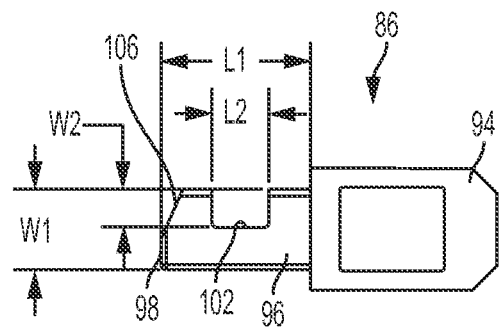
FIG. 5 illustrates a lock head of the security member.

Referring to FIG. 1, the illustrated security member 26 includes a lock head 86 and a cable 90. The lock head 86 is secured to an end of the cable 90. At least a portion of the lock head 86 is insertable into the opening 34 in the housing 30 of the electronic device 14 for engagement by the latch mechanism 22. As shown in FIG. 5, the illustrated lock head 86 includes a frame 94 that connects to the cable 90 and an insertable portion 96 extending from the frame 94. The insertable portion 96 is the part of the lock head 86 that is shaped and sized to be inserted into the opening 34 of the electronic device 14. The illustrated insertable portion 96 has a distal end 98 opposite the cable 90, and a recess 102 formed between the frame 94 and the distal end 98. In the illustrated embodiment, the recess 102 extends through a sidewall of the lock head 86, giving the insertable portion 96 a generally C-shape. The distal end 98 includes a ramped surface 106. The recess 102 is shaped and sized to receive a portion of the latch 46 so that the latch 46 extends into the recess 102 to secure the security member 26 to the electronic device 14.

The illustrated lock head 86 of the security member 26 is relatively small and compact. As shown in FIG. 5, a length L1 of the insertable portion 96 (measured from the frame 94 to the distal end 98) is about 12 mm, and a width W1 of the insertable portion 96 is about 6.5 mm. In addition, a length L2 of the recess 102 is about 4.5 mm, and a width W2 of the recess 102 is about 3 mm. In other embodiments, the lock head 86, and particularly the insertable portion 96, may have other suitable dimensions to fit within other shaped and/or sized openings. Due to the small size of the lock head 86, the security member 26 does not require a lot of space to connect to the electronic device 14. Likewise, the latch 46 is also relatively small to fit within the recess 102 of the lock head 86. As such, the latch mechanism 22 does not require a lot of space within the electronic device 14.

Referring back to FIG. 1, the cable 90 extends from the lock head 86 and is coupled to the immovable object 18. For example, the cable 90 may be wrapped around the immovable object 18 and looped through itself to secure the security member 26 to the immovable object 18. In other embodiments, the cable 90 may alternatively be a rigid member that extends from and is secured to the immovable object 18. During use, the cable 90 may be secured to the immovable object 18 before or after the lock head 86 is secured to the electronic device 14.

Figure 6:
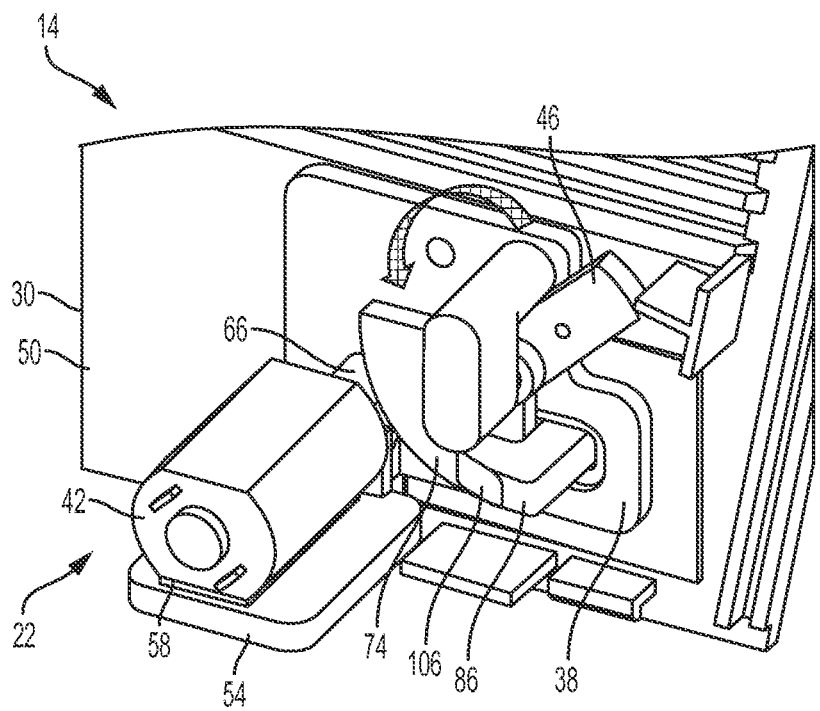
FIG. 6 is a perspective, internal view of the electronic device including the latch mechanism engaging the security member.
Figure 7:
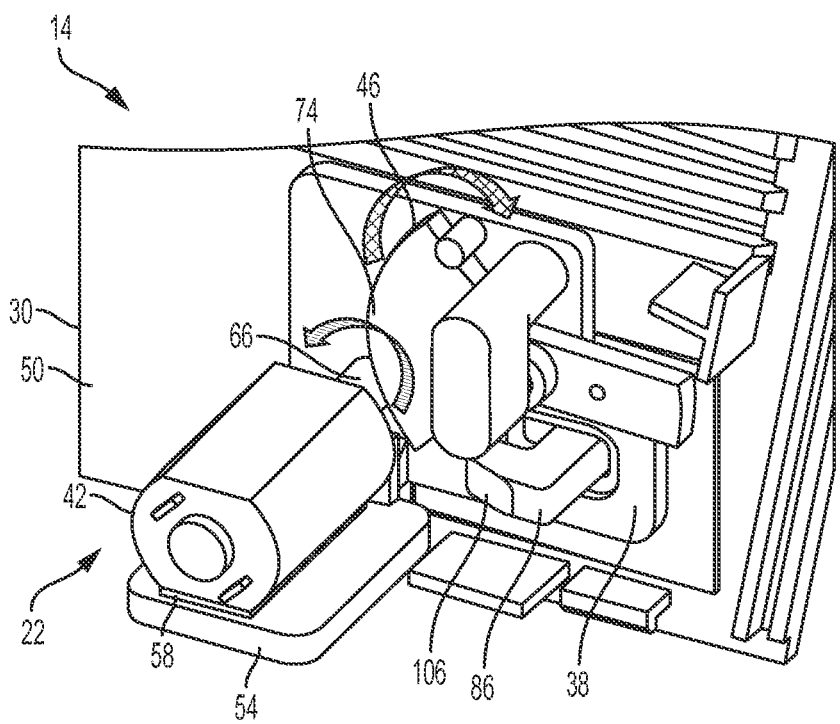
FIG. 7 is a perspective, internal view of the electronic device including the latch mechanism disengaging the security member.

FIGS. 6 and 7 illustrate the lock head 86 inserted into the opening 34 in the housing 30 of the electronic device 14. As shown in FIG. 6, the lock head 86 is engaged by the latch mechanism 22. In this position, a portion of the main body 74 of the latch 46 is received in the recess 102 of the lock head 86. The latch 46, thereby, inhibits the lock head 86 from being removed from (e.g., pulled out of) the opening 34 in the electronic device 14. As shown in FIG. 7, the lock head 86 is not engaged by the latch mechanism 22. In this position, the main body 74 of the latch 46 is pivoted away from the lock head 86. When the latch 46 is moved out of engagement with the lock head 86, the lock head 86 is removable from the opening 34 in the electronic device 14.

To secure the electronic device 14 to the immovable object 18, the lock head 86 of the security member 26 is first inserted into the opening 34 in the housing 30. As noted above, the latch 46 of the latch mechanism 22 may be biased to the engaged position (FIGS. 3 and 6) by the torsion spring 82 (FIG. 2). With such an arrangement, the ramped surface 106 of lock head 86 engages a corresponding surface on the latch 46 to temporarily push the main body 74 of the latch 46 away from the opening 34. Once the distal end 98 of lock head 86 clears the main body 74, the latch 46 can automatically pivot back to the engaged position by the force of the torsion spring 82. The geometry of the lock head 86 (e.g., the larger size of the frame 94 compared to the insertable portion 96) inhibits further movement of the lock head 86 into the opening 34 that may otherwise temporarily push the latch 46 away from the opening 34.

Alternatively, the latch 46 may be temporarily moved out of the way by the motor 42. With such an arrangement, the motor 42 may be energized to move the latch 46 to the disengaged position (FIGS. 4 and 7) for a predetermined amount of time (e.g., 5 seconds), allowing the lock head 86 to be inserted into the opening 34 in the electronic device 14 without interference. After the predetermined amount of time has passed, the latch 46 can move back to the engaged position by the force of the torsion spring 82 or by driving force from the motor 42.

To release the electronic device 14 from the immovable object 18, the motor 42 is energized to rotate the output pinion 66. As the output pinion 66 is rotated, the pinion 66 engages the gear teeth formed along the edge 78 of the latch 46 to pivot the latch 46 to the disengaged position (FIG. 7). While the latch 46 is in the disengaged position, the lock head 86 can be removed from the opening 34 in the electronic device 14. As noted above, the motor 42 may hold the latch 46 in the disengaged position for a predetermined amount of time (e.g., 5 seconds). If the lock head 86 is not removed from the opening 34 within that period of time, the latch 46 will move back to the engaged position, thereby inhibiting the lock head 86 from being removed from the opening 34.

In the illustrated embodiment, movement of the latch mechanism 22 is controlled by a portable apparatus 110

(FIGS. 8 and 9) that is separate from the electronic device 14 being secured. In some embodiments, the portable apparatus 110 is a smartphone. The portable apparatus 110 wirelessly communicates with the electronic device 14 to selectively energize the motor 42. As discussed above, energizing the motor 42 temporarily moves the latch 46 to the disengaged position so that the lock head 86 of the security member 26 is removable from the electronic device 14.

Figure 8:
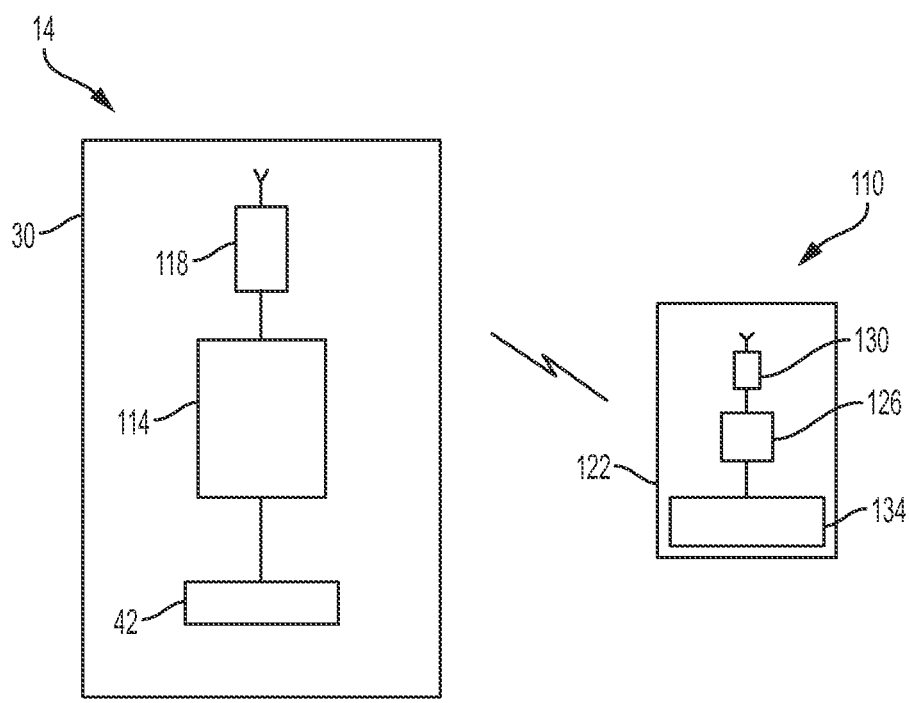
FIG. 8 schematically illustrates the electronic device communicating with a portable apparatus.

Referring to FIG. 8, the electronic device 14 includes a processor 114 and a transceiver 118 positioned within the housing 30. The processor 114 is coupled to the motor 42 to control operation of the motor 42 (e.g., to turn the motor 42 on and off). The processor 114 is also coupled to the transceiver 118. In some embodiments, the processor 114 and the transceiver 118 may be part of the same circuit board. Additionally, the processor 114 may be the existing processor in the electronic device 14 that performs the conventional functions of the electronic device 14, or may be a separate processor that is dedicated to the latch mechanism 22.

The portable apparatus 110 includes a housing 122, a processor 126 positioned within the housing 122, a transceiver 130 coupled to the processor 126 and positioned within the housing 122, and an input device 134 coupled to the processor 126. The transceiver 130 allows the portable apparatus 110 to wirelessly communicate with the transceiver 118 and the processor 114 of the electronic device 14. Specifically, the portable apparatus 110 can send a wireless signal (e.g., instructions) to the electronic device 14 via the transceiver 130. Sending the wireless signal is initiated by actuating the input device 134. In response to the wireless signal, the processor 114 of the electronic device 14 sends a command to the motor 42 to move the latch mechanism 22 out of engagement with the lock head 86 (i.e., to the disengaged position shown in FIG. 7). In the illustrated embodiment, the transceivers 118, 130 are configured to communicate using a conventional short range wireless protocol, such as BLUETOOTH. In other embodiments, the transceivers 118, 130 may be configured to communicate using a longer range wireless protocol such as, for example, a cellular network or WiFi.

The input device 134 is supported by the housing 122. In some embodiments, such as the illustrated embodiment, the input device 134 is a touchscreen of the portable apparatus 110. In other embodiments, the input device 134 may be buttons or keys on the housing 122 that are physically moved (e.g., depressed) by a user. In either embodiment, the functionality of the input device 134 may be part of an app or other program installed and stored in a non-transitory memory of the portable apparatus 110.

Figure 9:
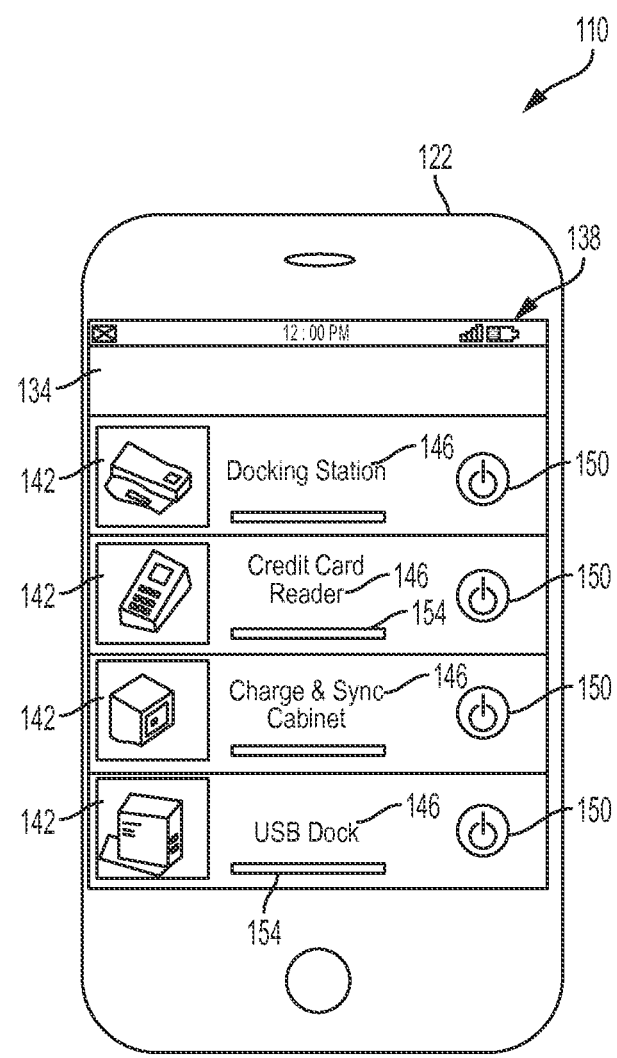
FIG. 9 illustrates the portable apparatus.

FIG. 9 illustrates one example of the portable apparatus 110 where the input device 134 is a touchscreen. The touchscreen 134 displays a user interface 138, which is part of the app installed on the portable apparatus 110. The illustrated interface 138 provides information regarding multiple electronic devices and their corresponding latch mechanisms. In the illustrated embodiment, four different devices are displayed on the touchscreen 134 simultaneously. In other embodiments, fewer or more devices may be displayed on the touchscreen 134 at the same time.

In the illustrated embodiment the user interface 138 includes an icon 142, a name 146, a power button 150, and a proximity indicator 154 associated with each electronic device. The icon 142 and the name 146 identify the corresponding electronic device. The icon 142 and the name 146 may be set and customized by a user when, for example, the portable apparatus 110 is paired with the electronic device 14. The power button 150 is an interactive element that may be pressed or touched by a user to actuate the latch mechanism 22 (e.g., energize the motor 42 to move the latch 46 from the engaged position to the disengaged position) of the corresponding electronic device. Each power button 150 may be independently actuated to selectively move the corresponding latch mechanism of the portable apparatus to the disengaged position.

The proximity indicator 154 provides an estimation of the portable apparatus's distance from the corresponding electronic device. Actuating the power buttons 150 may cause the motors 42 of the corresponding electronic devices to be energized and move the latches 46 only when the portable apparatus 110 is within a suitable or preset range (e.g., 10 meters) of each corresponding electronic device. The preset range may be a fixed value or a variable value set based on a user's preferences. In some embodiments, the estimated distance may be based on the signal strength of the corresponding electronic device. In the illustrated embodiment, the proximity indicator 154 is a bar that displays the estimated distance as a sliding scale. In other embodiments, the estimated distance may also or alternatively be displayed using other suitable proximity indicators (e.g., numerical distances).

In some embodiments, the user interface 138 can also indicate whether the corresponding electronic device has suitable power to energize the motor 42. For example, the user interface 138 may display a battery icon associated with each electronic device. The battery icons can help a user identify if the corresponding latch mechanisms 22 are failing to disengage due to lack of power in the devices.

In other embodiments, the portable apparatus 110 may be a tag or fob that passively sends wireless messages to the electronic device 14. When the tag or fob is within a suitable range of the electronic device 14 (e.g., 10 meters), an actuator on the device 14 may be actuated (e.g., a button may be depressed) to move the latch mechanism 22 to the disengaged position. If the tag or fob is not within the suitable range, actuating the actuator will not move the latch mechanism 22.

In further embodiments, operation of the motor 42 may be controlled by entering a password, passcode, or biometric identifier directly into the electronic device 14. In such embodiments, a separate portable apparatus may not be required to operate the latch mechanism 22.

In some embodiments, the electronic device 14 may further include a mechanical release. The mechanical release may be supported by the housing 30 for actuation by a user. As an example, the mechanical release may be a cylinder lock that is actuated by a key to selectively move the latch mechanism 22. The mechanical release allows the latch mechanism 22 to be moved to the disengaged position even when the electronic device 14 is not connected to a suitable power source.

Various features and advantages of the invention are set forth in the following claims.

What is claimed is:

1. A system comprising:
an electronic device including
a housing having an opening formed therein,
a processor positioned within the housing,
a motor positioned within the housing and coupled to the processor, and
a latch positioned within the housing adjacent the opening, the latch being driven by the motor to move relative to the housing; and a security member securable to an immovable object, the security member including a lock head that is insertable into the opening in the housing, the lock head having a recess into which the latch extends to secure the security member to the electronic device;
wherein the motor is operable to move the latch out of the recess in the lock head to release the security member from the electronic device,
wherein the latch pivots relative to the housing between a first position, in which the latch engages the lock head, and a second position, in which the latch is spaced apart from the lock head,
wherein the latch extends over a portion of the opening while in the first position, and wherein the latch is moved away from the opening while in the second position,
wherein the latch is biased toward the first position, and
wherein the lock head includes a distal end having a ramped surface, and wherein the ramped surface engages the latch as the lock head is inserted into the opening to move the latch toward the second position.

2. The system of claim 1, wherein the motor includes an output pinion, and wherein the latch includes an edge having gear teeth that engage the output pinion.

3. The system of claim 1, wherein the electronic device further includes a base coupled to an inner surface of the housing adjacent the opening, and wherein the motor is supported by the base.

4. The system of claim 1, wherein the electronic device further includes a spring coupled to the latch, and wherein the spring biases the latch into engagement with the lock head.

5. The system of claim 1, wherein the security member further includes a cable secured to and extending from the lock head, and wherein the cable is configured to engage the immovable object.

6. The system of claim 1, further comprising a portable apparatus, wherein the portable apparatus wirelessly communicates with the processor of the electronic device to selectively operate the motor.

7. A system comprising:
an electronic device including
a housing having an opening formed therein,
a processor positioned within the housing, and
a latch mechanism positioned within the housing and coupled to the processor;
a security member securable to an immovable object, the security member including a lock head that is insertable into the opening in the housing and engageable by the latch mechanism; and
a portable apparatus operable to send a wireless signal to the processor of the electronic device;
wherein the processor is operable to selectively move the latch mechanism out of engagement with the lock head of the security member in response to the wireless signal.

8. The system of claim 7, wherein the latch mechanism includes a motor positioned within the housing and coupled to the processor, and a latch that is selectively driven by the motor.

9. The system of claim 7, wherein the portable apparatus includes an input device, and wherein the input device is selectively actuatable by a user to send the wireless signal to the processor of the electronic device.

10. The system of claim 9, wherein the input device is a touchscreen, and wherein the touchscreen displays a button associated with operation of the latch mechanism.

11. The system of claim 10, wherein the touchscreen displays a plurality of icons associated with a plurality of electronic devices, each electronic device including a housing, a processor, and a latch mechanism, and wherein the touchscreen displays a plurality of buttons associated with the operation of the latch mechanism of the corresponding electronic device.

12. The system of claim 10, wherein the touchscreen displays a proximity indicator that provides an estimation of a distance of the portable apparatus from the electronic device.

13. A method of securing an electronic device to an immovable object, the electronic device including a housing having an opening formed therein, a processor positioned within the housing, and a latch mechanism positioned within the housing and coupled to the processor, the method comprising:
securing a security member to the immovable object, the security member including a lock head;
inserting the lock head of the security member into the opening of the housing;
engaging the lock head of the security member with the latch mechanism to secure the electronic device to the immovable object;
sending a wireless signal, by a portable apparatus, to the processor of the electronic device; and
moving the latch mechanism out of engagement with the lock head of the security member in response to the wireless signal.

14. The method of claim 13, wherein the latch mechanism includes a motor positioned within the housing and coupled to the processor, and a latch that is selectively driven by the motor, wherein the lock head includes a recess, and wherein engaging the lock head includes extending the latch into the recess of the lock head.

15. The method of claim 14, wherein moving the latch mechanism out of engagement with the lock head includes energizing the motor to move the latch out of the recess in the lock head.

16. The method of claim 14, wherein the latch is movable relative to the housing between a first position, in which the latch engages the lock head, and a second position, in which the latch is spaced apart from the lock head, wherein the latch is biased toward the first position, and wherein inserting the lock head into the opening includes engaging the latch with the lock head as the lock head is inserted into the opening to move the latch toward the second position.

* * * * *